United States Patent
Yu et al.

(10) Patent No.: US 7,784,201 B2
(45) Date of Patent: Aug. 31, 2010

(54) SYSTEM AND METHOD OF UTILIZING MONITORING DATA TO ENHANCE SEAFLOOR SULFIDE PRODUCTION FOR DEEPWATER MINING SYSTEM

(75) Inventors: Chenteh Alan Yu, Houston, TX (US); Yongming Cheng, Houston, TX (US)

(73) Assignee: Technip France, Courbevoie (FR)

( * ) Notice: Subject to any disclaimer, the term of this patent is extended or adjusted under 35 U.S.C. 154(b) by 10 days.

(21) Appl. No.: 12/371,149

(22) Filed: Feb. 13, 2009

(65) Prior Publication Data

US 2009/0284068 A1     Nov. 19, 2009

Related U.S. Application Data

(63) Continuation-in-part of application No. 12/236,023, filed on Sep. 23, 2008, now Pat. No. 7,690,135.

(60) Provisional application No. 60/974,472, filed on Sep. 23, 2007.

(51) Int. Cl.
    *E02F 1/00*     (2006.01)
(52) U.S. Cl. ...................................... 37/314
(58) Field of Classification Search ........... 37/309–345; 166/350, 359, 367, 243; 114/293, 264; 405/195.1, 405/224.4, 223.1
See application file for complete search history.

(56) References Cited

U.S. PATENT DOCUMENTS

| | | | |
|---|---|---|---|
| 3,438,142 A | 4/1969 | Krutein | |
| 3,522,670 A | 8/1970 | Flipse et al. | |
| 4,030,216 A | 6/1977 | Willums | |
| 4,195,426 A | 4/1980 | Banzoli et al. | |
| 4,200,054 A | 4/1980 | Elliston | |
| 4,232,903 A | 11/1980 | Welling et al. | |

(Continued)

FOREIGN PATENT DOCUMENTS

WO      9907949      2/1999

(Continued)

OTHER PUBLICATIONS

Saida Isliy, Invitation to Pay Additional Fees—Communication Relating to the Results of the Partial International Search for International Patent Application No. PCT/US2008/083513, dated May 19, 2009, European Patent Office, Germany.

(Continued)

*Primary Examiner*—Robert E Pezzuto
(74) *Attorney, Agent, or Firm*—Locke Lord Bissell & Liddell LLP

(57) ABSTRACT

Applicants have created a method and system of deep sea mining comprising mining SMS deposits from the sea floor with a subsea miner, pumping the solids from the subsea miner through a jumper and pumping the solids from the jumper up a riser to a surface vessel. Further, applicants have created a method of deploying a deep sea mining system, comprising stacking a riser hangoff structure on top of a subsea pump module forming an assembly; picking up the assembly by a hanging mechanism, hanging the assembly on a moon pool, attaching a first riser joint; disconnecting the riser hangoff structure from the assembly; and attaching at least one second riser joint to form the riser.

18 Claims, 14 Drawing Sheets

U.S. PATENT DOCUMENTS

| | | | |
|---|---|---|---|
| 4,307,609 A | 12/1981 | Rosenblum |
| 4,718,835 A | 1/1988 | Maruyama |

FOREIGN PATENT DOCUMENTS

| | | |
|---|---|---|
| WO | 2008138060 | 11/2008 |

OTHER PUBLICATIONS

International Search Report for International Patent Application No. PCT/US2010/022042, European Patent Office, dated Jun. 9, 2010.

Written Opinion for International Patent Application No. PCT/US2010/022042, European Patent Office, dated Jun. 9, 2010.

US 7,784,201 B2

SYSTEM AND METHOD OF UTILIZING MONITORING DATA TO ENHANCE SEAFLOOR SULFIDE PRODUCTION FOR DEEPWATER MINING SYSTEM

CROSS REFERENCE TO RELATED APPLICATIONS

This application claims the benefit of U.S. Provisional Application Ser. No. 60/974,472 filed Sep. 23, 2007, which is incorporated by reference. This application is a continuation-in-part of U.S. patent application Ser. No. 12/236,023, which was filed on Sep. 23, 2008 now U.S. Pat. No. 7,690,135, the contents of are incorporated herein by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to deep sea mining; and more specifically related to a deep sea mining riser and lift system for mining and producing solids including seafloor massive sulfide (SMS) deposits.

2. Description of the Related Art

Seafloor massive sulfide deposits, or SMS deposits, are modern equivalents of ancient volcanogenic massive sulfide ore deposits or VMS deposits. SMS deposits are currently forming in the deep ocean around submarine volcanic arcs, where hydrothermal vents exhale sulfide-rich mineralizing fluids into the ocean. SMS deposits are laterally extensive and are comprised of a central vent mound around the area where the hydrothermal circulation exits, with a wide apron of unconsolidated sulfide silt or ooze which precipitates upon the seafloor. Recent finding show that SMS fields have a typical size of about 500 meters wide by 1000 meters long by about 10 to 20 meters deep in a very rugged seafloor terrain. The water depth also ranges from 1,500 meters to 2,500 meters.

Economic extraction of SMS deposits is largely in the theoretical stage, the biggest complication being the extreme water depths at which these deposits are forming.

Thus, there remains a need for a deep sea mining riser and lift system for mining and producing solids, such as seafloor massive sulfide deposits.

The inventions disclosed and taught herein are directed to improved systems and methods for a deep sea mining riser and lift system for mining and producing solids including seafloor massive sulfide deposits.

BRIEF SUMMARY OF THE INVENTION

Applicants have created a method and system of deep sea mining comprising mining SMS deposits from the sea floor with a subsea miner, pumping the solids from the subsea miner through a jumper and pumping the solids from the jumper up a riser to a surface vessel. Further, applicants have created a method of deploying a deep sea mining system, comprising stacking a riser hangoff structure on top of a subsea pump module forming an assembly; picking up the assembly by a hanging mechanism, hanging the assembly on a moon pool, attaching a first riser joint; disconnecting the riser hangoff structure from the assembly; and attaching at least one second riser joint to form the riser.

Applicants have further created a method of monitoring and adjusting a flow rate of a slurry in a riser system of a deep sea mining system, the slurry having a quantity of water and the riser system having a riser, which comprises measuring an in-situ volumetric concentration of the slurry in the riser system, which comprises providing a U-loop tube downstream of the riser; providing at least two pressure sensors coupled to the U-loop tube on each side of the U-loop tube; and using at least four pressure readings of the pressure sensors to calculate the in-situ volumetric concentration of the slurry in the riser; measuring a weight of the riser; and adjusting the amount of water in the slurry to change the flow rate of the slurry.

DETAILED DESCRIPTION

Figure 1:
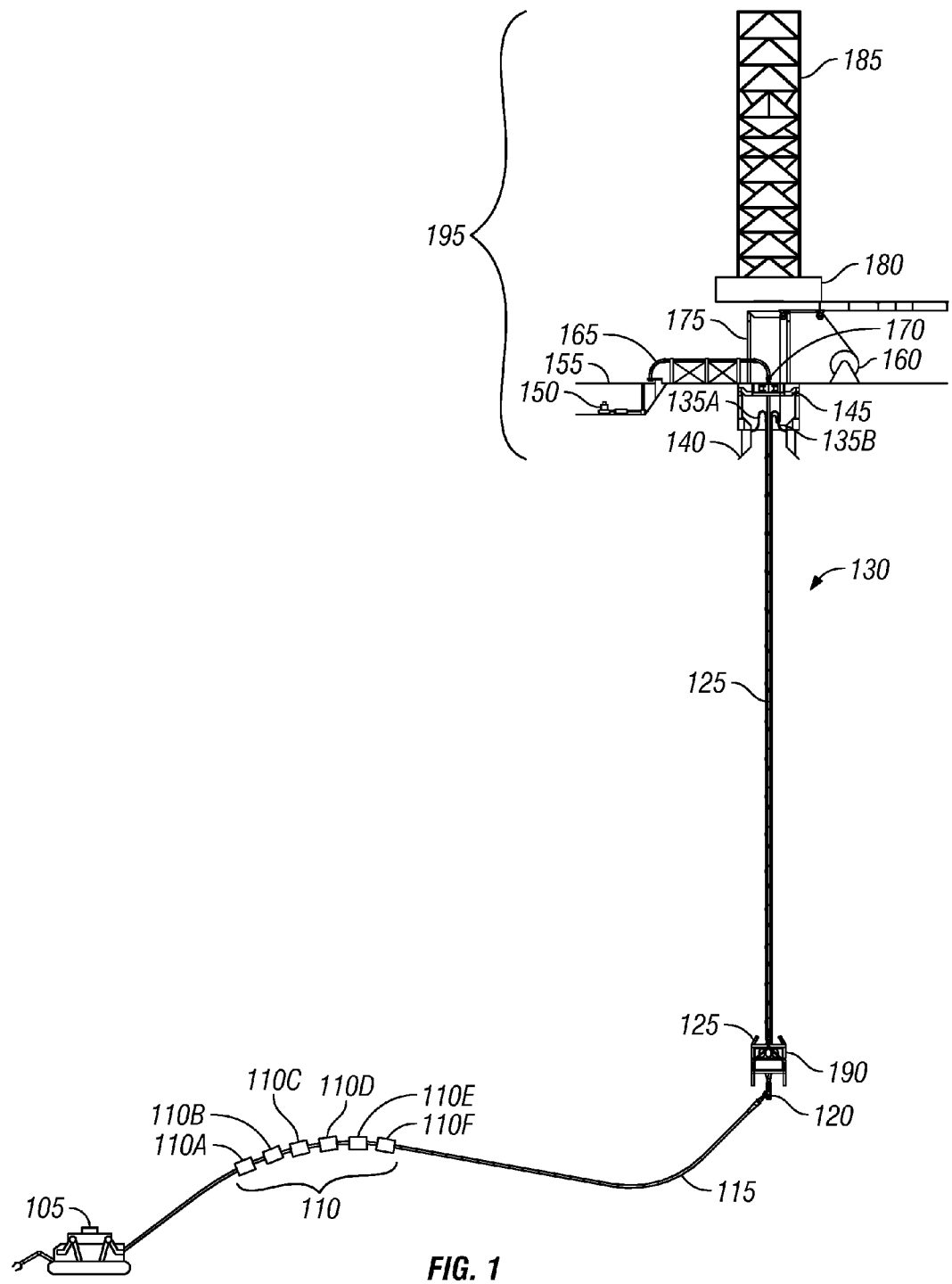
FIG. 1 illustrates a particular embodiment of a deep sea mining riser and lift s system utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams, operational illustrations of methods, sequences, steps and/or process. It will be understood that each block of the block diagrams and/or operational illustrations, sequences, steps, processes and combinations thereof, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures may occur out of the order. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

Applicants have created a method and system of deep sea mining comprising mining SMS deposits from the sea floor with a subsea miner, pumping the solids from the subsea miner through a jumper and pumping the solids from the jumper up a riser to a surface vessel. Further, applicants have created a method of deploying a deep sea mining system, comprising stacking a riser hangoff structure on top of a subsea pump module forming an assembly; picking up the assembly by a hanging mechanism, hanging the assembly on a moon pool, attaching a first riser joint; disconnecting the riser hangoff structure from the assembly; and attaching at least one second riser joint to form the riser.

Applicants have further created a method of monitoring and adjusting a flow rate of a slurry in a riser system of a deep sea mining system, the slurry having a quantity of water and the riser system having a riser, which comprises measuring an in-situ volumetric concentration of the slurry in the riser system, which comprises providing a U-loop pipe downstream of the riser; providing at least two pressure sensors coupled to the U-loop tube on each side of the U-loop tube; and using at least four pressure readings of the pressure sensors to calculate the in-situ volumetric concentration of the slurry in the riser; measuring a weight of the riser; and adjusting the amount of water in the slurry to change the flow rate of the slurry.

FIG. 1 is an illustration of a system for mining and producing solids, including SMS, through dynamically suspended subsea pump(s) at the bottom of a vertical riser that extends to the surface vessel using an environmentally safe surface closed loop wastewater system to power the subsea pump. The subsea miner 105 may be used to mine the solids, including SMS, from the seafloor. Recent finding show that SMS fields have a typical size of about 500 meters wide by 1000 meters long by about 10 to 20 meters deep in a very rugged seafloor terrain. The water depth also ranges from 1,500 meters to 2,500 meters. The subsea miner 105 may work on the rugged terrain with slopes as high as 25 degrees. Therefore, the subsea miner 105 ideally would be designed to perform under these rugged deep sea conditions. The subsea miner 105 could be designed to mine the SMS by performing any combination of the following steps, including, but not limited to, (1) excavating the SMS from the fields located on the seabed floor, (2) breaking down the SMS into chunk sizes using a cutter mounted on the excavator, and (3) forcing the SMS into in a crusher to crush the SMS into manageable sizes to ensure the SMS passes through the jumper 115. Many variations and embodiments are envisioned for the subsea miner 105.

The jumper 115 may also be referred to as the horizontal transport pipe or a riser transport pipe. The jumper may be configured in an "S" shape and be positioned in a horizontal direction to decouple the pump motion and vessel motion from the subsea miner 105. When the jumper is configured in an "S" shape it allows for some slack between the subsea miner 105 and the dump valve assembly 120 so that when the two devices move the subsea miner 105 is not upset, overturned or otherwise disrupted due to a tension in the jumper 115. The force exerted by the subsea pump 190 on the subsea miner 105 may also be minimized. Without decoupling the motion, the pulling force exerted on the subsea miner 105 compounded with high field angle may topple the subsea miner 105.

The other function of the "S" shape jumper 115 is to provide a gentle slope and large radius to lower the centrifugal force of solids passing through the jumper 115. A large radius may lower the centrifugal force and wear. The large radius of the jumper 115 may provide the product mixture flow to be away from the particle impact wear mechanism and into the sliding wear mechanism. The two key parameters of the sliding wear are the flow velocity V and the radius R. The jumper 115 may be rotated along its axis for making up to the dump valve assembly 120 and the subsea miner 105. By doing so, the curved up side on the buoyed section 110 is rotated out from field to field, which may increase the field service life of the jumper. To keep track of the rotating, special markings can be used to keep track of the curved side of the jumper 115 to increase the service life. For example, for a 155-meter long jumper, the nominal horizontal distance between the dump valve and the subsea excavator is at 100 meters +/−20 meters. The elevation differences between the dump valve and the excavator can be as high as 55 meters +/−20 meters. For a field with 180 meters total elevation changes, the length of the riser 130 may only need to be changed limited number of times.

The subsea miner 105 may maintain its horizontal duration and "S" shape using a number of apparatuses and techniques. First, buoyancy devices, such as buoys (collectively 110) may be used to float the jumper 115 at the ideal location. Second, the proper distance between the subsea miner 105 and the dump valve assembly 120 may be maintained by using a system to control the position of the surface vessel 195, such as a dynamic position ship, ship shaped vessel or deep sea barge. In order to maximize the production up time and to maintain the horizontal "S" shape of the jumper 115, a dynamic position vessel tracking may be used to track the subsea miner 105. To do so, transponders may be mounted on the subsea miner 105 as well as the dump valve assembly 120. The position and elevation of the subsea miner 105 and the dump valve may be fed to a computer on board a surface vessel 195, such as dynamic positioning vessel for computing the horizontal and vertical distance between the subsea miner 105 and the dump valve assembly 120. An operational window of the horizontal and vertical distances may also be provided. Once those distances are outside of the provided operational window, either the nominal location of the surface vessel 195 (and as a result the dump valve assembly 120) or the length of the riser 130 may need to be adjusted. For example, for a 155-meter long jumper 115, the horizontal distance between the dump valve assembly 120 and the subsea miner 105 would ideally be maintained at 100 meters +/−20 meters and the elevation to be maintained at 55 meters +/−20 meters. It should be noted that due to the connection, the dump valve assembly 120 may move with surface vessel 190. The horizontal distance between the surface vessel 195 (and as a result the dump valve assembly 120) and the subsea miner 105 may be maintained by moving the surface vessel 195. However, if the elevation difference is outside of the +/−20 meters operational, joints from the pup joint set may need to be added to or removed from the riser 130 to lengthen the riser 130 to compensate the elevation differences.

In its exemplary embodiment, the internal diameter of the jumper 115 may be purposely sized smaller than the vertical pipe to increase the flow speed to prevent solids from settling inside the horizontal transport pipe. The term "coupled," "coupling," and like terms used herein relative to the inventions described includes any method or devices for securing, bonding, fastening, attaching, engaging, joining, inserting therein, or forming on, in or with other associated members as an integral component or not. After the solids have been mined by the subsea miner 105, which is coupled to the jumper 115, the solid may be transported through a jumper 115.

The solids may then be transported through the by-pass to the dump valve assembly 120, up through the riser main tube 125 to the surface vessel 195. The subsea pump(s) 190 may be configured into two sub-modules with one sub-module sufficient for partial production. One of the two water injection lines 135 is routed to power one pump sub-module for redundancy. The dump valve assembly 120 inside subsea pump(s) 190 may be passively hanging at the bottom of the riser 115.

Proper tensions may be important to any vertical riser systems, including riser 125, especially in this water depth in order to maintain the shape of the risers, to prevent clashing with adjacent equipment, and to reduce cyclic stress intensities along the riser 130. By placing the subsea pump(s) 190 at the bottom of the riser 130, the entire riser 130 may receive the needed riser tension due to the weight of the subsea pump(s) 190. In the preferred embodiment, the ideal tension factor may be greater than 1.2. The tension factor is defined as the ratio of the top end tension to the submerged weight of the riser string. For example, if the pump modules weigh from 100 to 150 tons placed at the bottom and the outer diameter of the riser is thirteen to fourteen inches with a one-half to three-quarter inch wall, a 1.2 tension factor can be achieved.

The systems describe herein may be ideally designed to have the pumping power and efficiency to lift the solids, especially SMS, from the deep seafloor to the surface. Further, the vertical riser, or simply riser 130 may be designed with the proper tension as discussed above, for coping with the flow induced vibration, current and vessel motion induced fatigue. Upon arriving at the top end of the riser 130, the solids, such as SMS, may be dewatered. The wastewater from the dewatering may be pumped out at the surface or preferably pumped into the water injection lines 135A and 135B (collectively 135) which may be piggy backed onto the riser main tube 125 (both contained in riser 130) down to the compression chamber of the pumps modules 190. The wastewater can be used to power the compression chamber of the pump(s) 190 to lift the solids to the surface vessel 195. The wastewater can then be discharged into a diffuser to reduce the wastewater speed and pressure prior to discharging into the sea floor. To avoid the wastewater disposal-created side load and pluming, a subsea diffuser will be devised at the end of the discharge line to discharge wastewater vertically with the discharge force balanced in horizontal direction. This arrangement of the wastewater and water injection lines 135 forms a surface closed loop for wastewater disposal. In this embodiment, the wastewater is utilized to power the subsea pump(s) 190 and then discharged into the sea at the sea floor level. As a result, either all the solids mined from the seafloor are captured in the surface vessel as solid product or as the wastewater residual which is discharged back into the sea floor. The process of cycling the wastewater may occur in about fifteen minutes. This type of arrangement may form a surface closed loop wastewater system. The discharging the wastewater close to the seafloor as opposed close to the sea level is environmental friendly and allows the wastewater to power the subsea pumps 190. Further, this embodiment discharges the wastewater close to the seafloor without additional risers because the wastewater travels down the single riser assembly 130 of this embodiment.

There may be situations where the jumper assembly 120 may need to be disconnected from the riser 130 and thus the surface vessel 195. For example, in the event of the dynamic system failure, the top end of the jumper assembly 120 is equipped with (1) a subsea remotely operated vehicle (ROV) operated or (2) a pump power pack operated hydraulic connector which can be disconnected to protect the jumper 130 from being overstretched or subsea miner 105 being toppled. The ROV may be kept on standby to execute the disconnect procedure. To disconnect the jump assembly 120, the ROV may grab the jumper handle bar of the control panel on the subsea pumps 190. The ROV operators on the vessel may be prepared for an emergency disconnect. The ROV may then disconnect the hydraulic connector between the jumper assembly 120 and the riser 130. If an ROV is not available or desirable, another option may be to connect the hydraulic circuits of the hydraulic connector to the control panel of the subsea pumps 190. An umbilical for sending the hydraulic or electric signals from the pump control panel may be installed in the control room of the surface vessel 195. Once disconnected the horizontal jumper 115 may drop to the sea floor. A recovery procedure may be carried out to retrieve the jump assembly 120 and the horizontal jumper 115.

There are at least two types of wear mechanism in slurry transport: (1) the sliding wear and (2) the particle impact wear. The vertical section of the main riser is susceptible mainly to the sliding wear with the exception of the pump exit at the bottom and the top end elbow exit for the vertical riser configuration shown in FIG. 1. These non-straight areas will have turbulence flow and eddy current around the discontinuities, which may cause wear and an attrition effect. For the vertical riser section, the high strength and yet ductile material may be selected along with a one-eighth inch wear allowance for the wall thickness to cope with the potential wear. The combination of the unknown particle size distribution, hardness, PH values and volumetric concentration in the fluid all pointed to the post facto test program for quantifying the wear coefficient for the future projects. An outer diameter ultrasonic in-situ periodic examination of the wall thickness in the strategic areas of the vertical riser may provide a way to ensure that a sufficient wall thickness remains for the remaining production period. For the pump exit where the turbulence flow may be prevalent, a one half inch wear allowance may be implemented along with the forgings having high chrome contents. The riser system outer diameter may also be coated with thermally sprayed aluminum with anodes placed in the pump modules and near the moon pool. Electric continuity along the entire riser may be added to affect the corrosion protection system. The interaction of the wear and corrosion may be minimized with the systems and methods described above.

Figure 2:
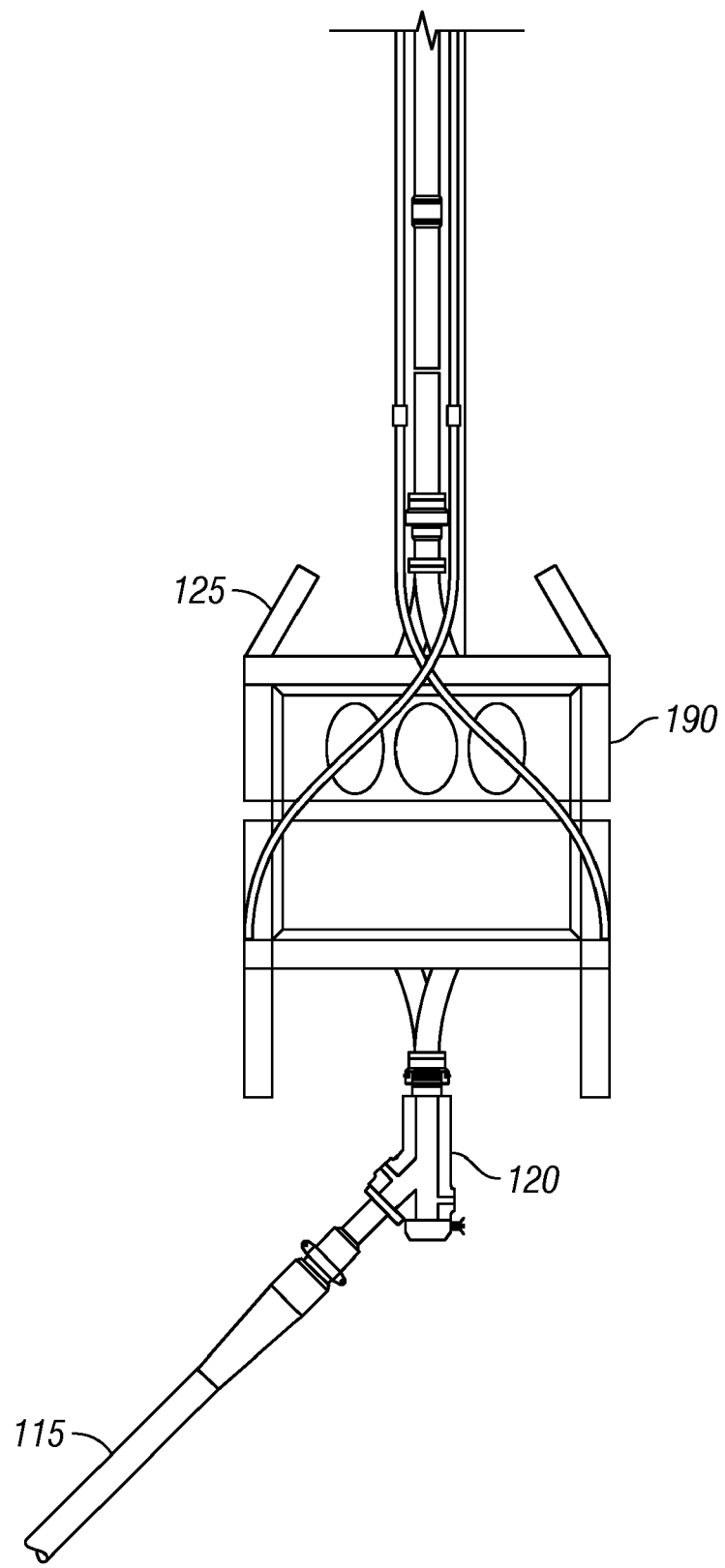
FIG. 2 illustrates a particular embodiment of a bottom dump valve connection utilizing certain aspects of the present inventions.

FIG. 2 is an illustration of the bottom of the pump being suspended above the sea floor, preferably about fifty-five meters. This distance is ideal to ensure that the bottom of the subsea pump(s) 190 do not contact the sea floor during the production operation.

A dump valve assembly 120 at the vicinity of pumps may be desirable when solids in the riser 130 fall and accumulate at the bottom of the riser 130, such as when the water power is interrupted or the pumping action stops. To remove the fallen solids, the dump valve assembly 120 may be opened to allow the cumulated solids to be dumped out and the production restarted. The dump valve assembly 120 may be opened and closed either opening a manually operated valve with the ROV or a power pack assisted operation from the subsea pump(s) 190. The dump valve is generally designed for a failed-safe open mode where the dump valve is to remain closed with hydraulic power on. A full bore passage and shute may be needed to dump quickly the solids out and to direct the solids away from the subsea pump(s) 190 top. The ROV may be used to ensure the solids are not obstructing the riser 130 and ensure the dump valve is closed for resuming production.

Figure 3:
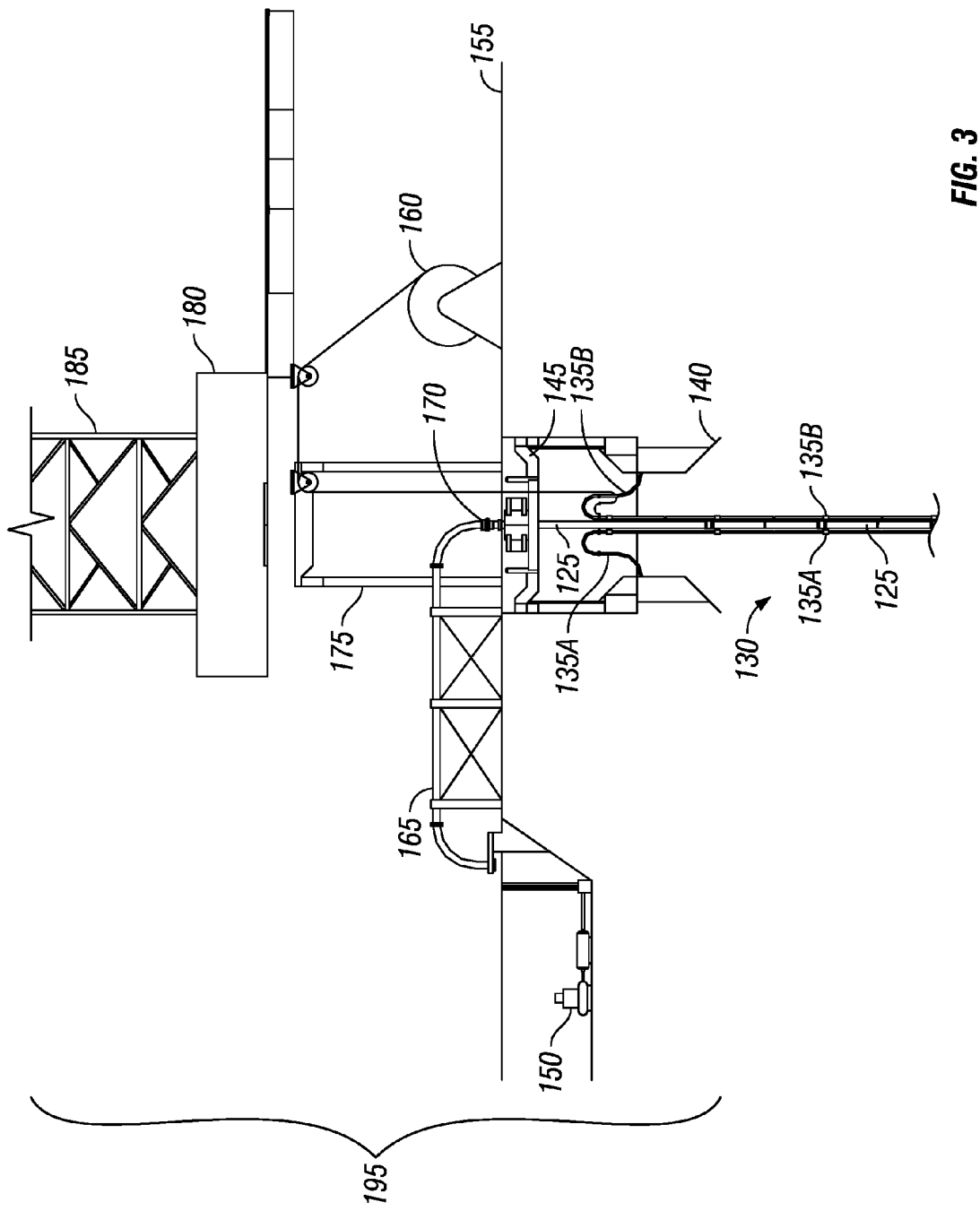
FIG. 3 illustrates a particular embodiment of a top end termination of a deep sea mining riser and lift system utilizing certain aspects of the present inventions.

FIG. 3 is an illustration of the dual surface closed loop water injection lines 135 for environmental safe wastewater disposal and lift system redundancy. The figure depicts the top end termination of the riser system where a upper termination spool or flex joint 170 is supported in a support receptacle which in turn is supported by a spider beam structure 145. Also shown in FIG. 3 are the dual water injection lines 135A and 135B (collectively 135) from the dewatering system to top of the riser 130. The produced solids and water mixture may be dumped into the dewatering hopper through the surface production spool 165. The wastewater may be filtered and pumped into the water injection lines 135 by the filter 150. The water injection lines 135 may be bundled to the main riser pipe 125.

Figure 4:
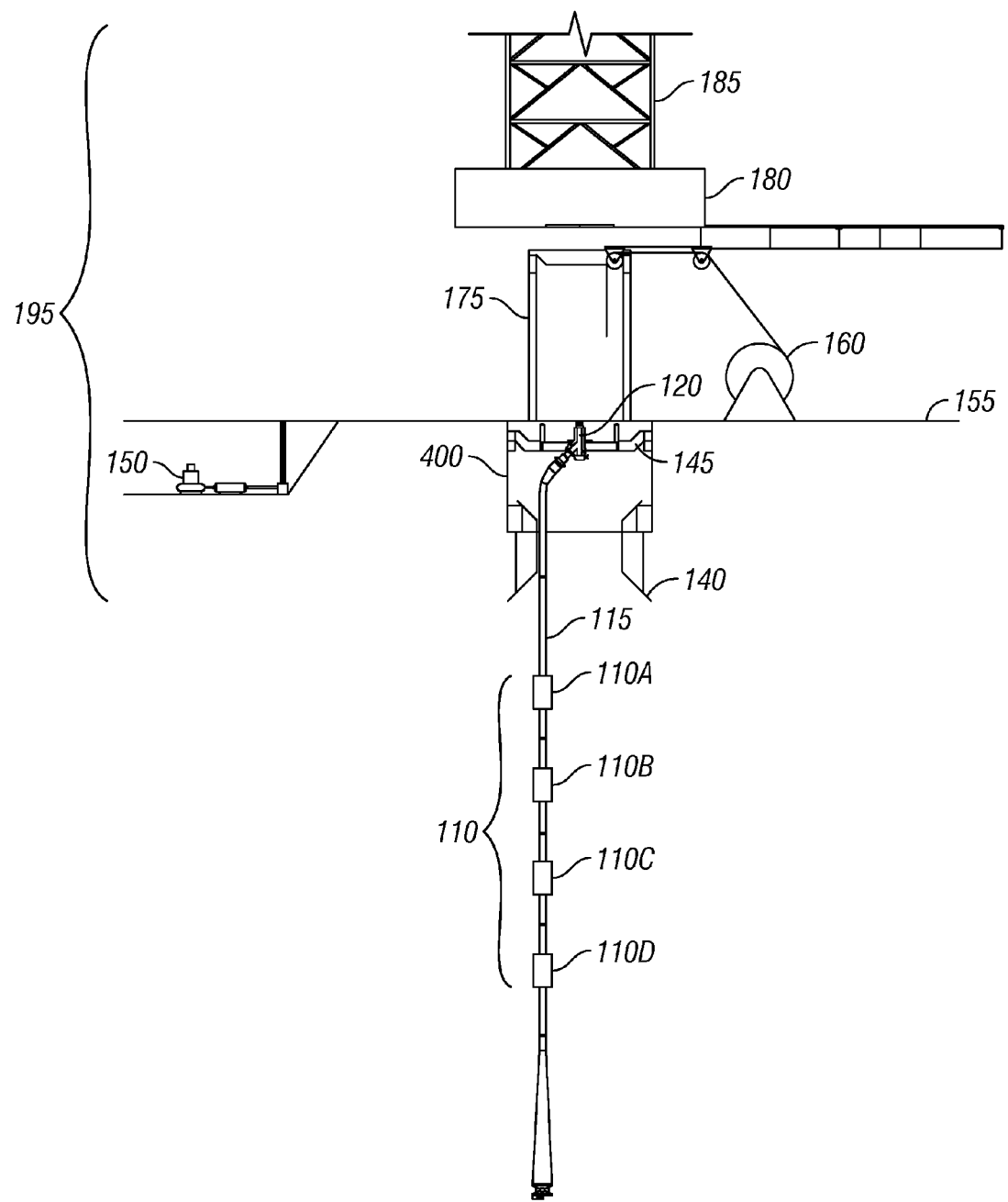
FIG. 4 illustrates a particular embodiment of an installation of a jumper on the dump valve utilizing certain aspects of the present inventions.
Figure 5:
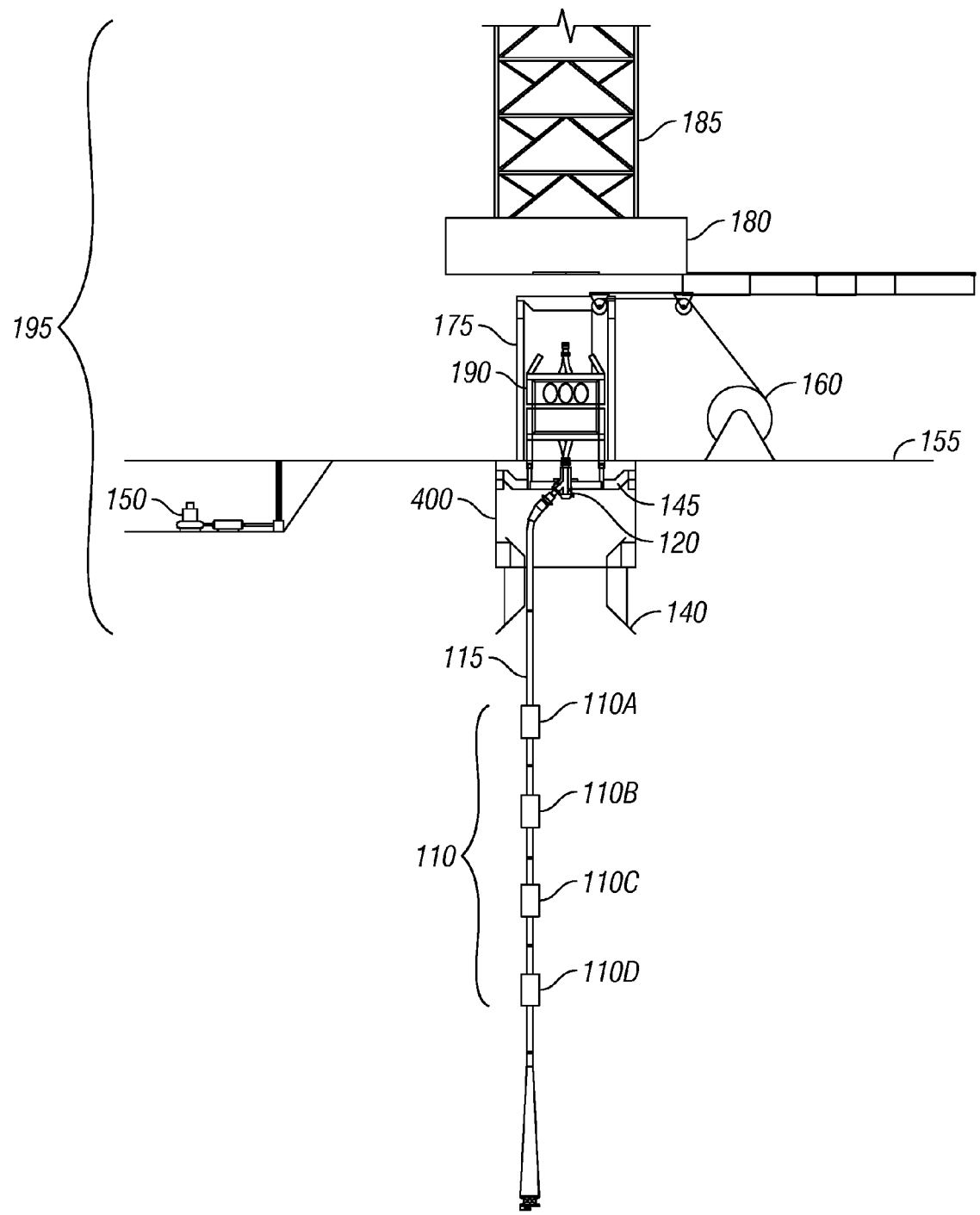
FIG. 5 illustrates a particular embodiment of an installation of subsea pumps on a dump valve utilizing certain aspects of the present inventions.
Figure 6:
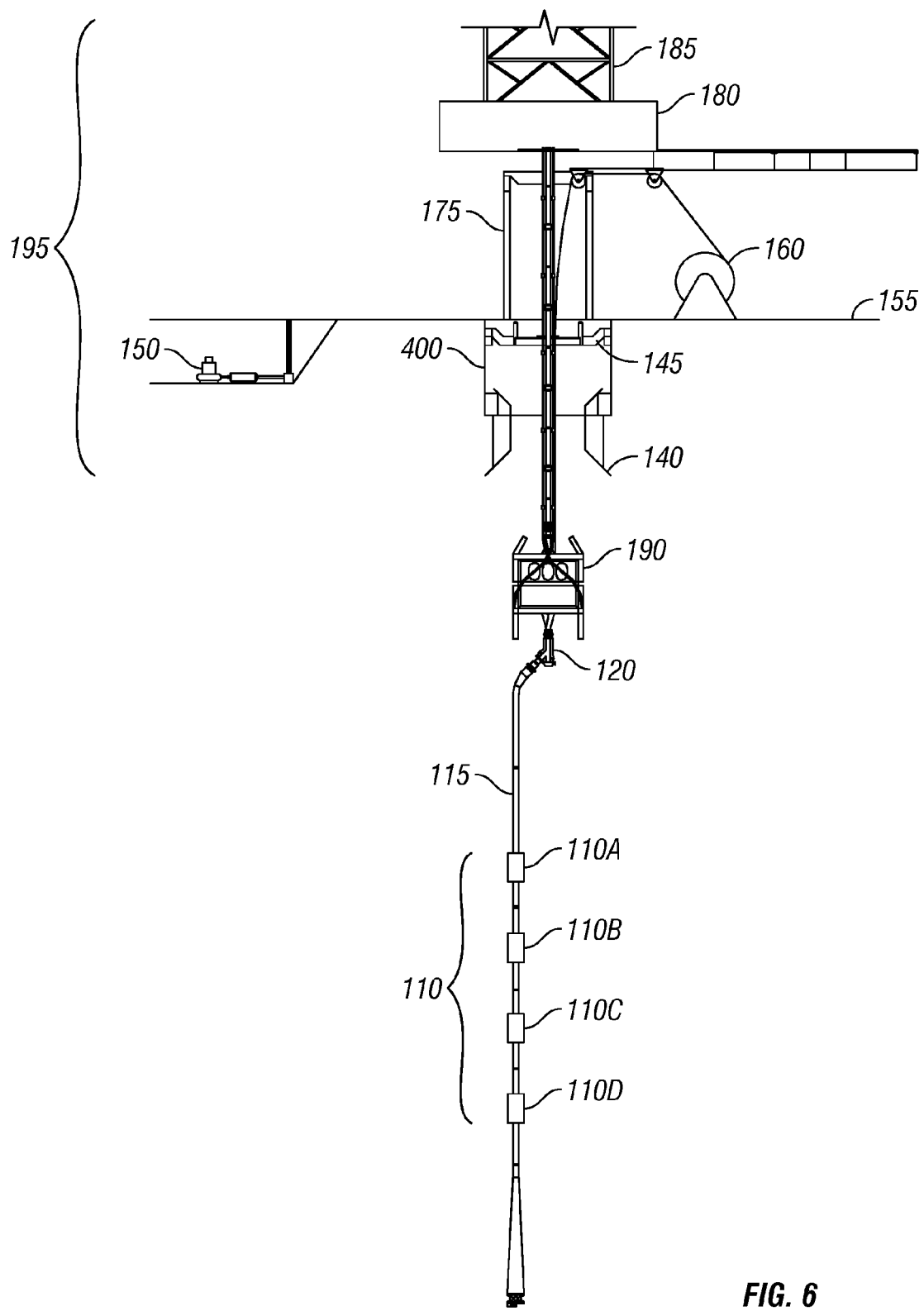
FIG. 6 illustrates a particular embodiment of an installation of a latch riser joint onto the pump module utilizing certain aspects of the present inventions.

FIGS. 4 to 6 are illustrations of an exemplary embodiment of a rig and hoisting system for deploying and retrieving the riser and lift system. FIGS. 4 to 6 illustrate the sequence of installing an exemplary riser and lift system. The dump valve assembly can be the first assembly to be presented in the moon pool 400 and onto the spider beam 145. The moon pool may be designed to be a large enough opening to allow the passage of the subsea pump(s) 190. The jumper 115 may be stored on the spool. A messenger line can be installed and connected from the moon pool to the horizontal jumper pulling head. With the assistance of a ROV, the jumper 115 can be presented to the moon pool vertically as shown in FIG. 4. The upper end of the jumper 115 is connected to the side inlet of the dump valve assembly 120. Due to the eccentric load, the spider beam 145 can be designed to support and keep the dump valve assembly 120 and the jumper 115 assembly upright for connecting to the subsea pump(s) 120. For safety reasons, a hydraulic connector assembly can be assembled below the bottom of the subsea pumps 190 with the hydraulic plumbing routed to the pump control interface. As is shown in FIG. 5, the two water injection line receptacles can be assembled next to the male hydraulic connector. The hydraulic connector may be landed onto the male hydraulic connector with the water injections line stab in the receptacle at the same time. The o-ring type of seals may be used to seal the water injection lines against their receptacles. A dummy ROV hot stab may be needed to actuate the hydraulic lock function after the hydraulic connector is properly landed on top of the dump valve. An indicator rod on the hydraulic connector can show the proper make up of the hydraulic connector. The subsea pump 190 may then picked up by the rig 180. As is shown in FIG. 6, the spider beam 145 may open to allow the pump to pass through then closed to support the subsea pump(s) 190 at the transition joint. The first riser joint can be presented to the moon pool 140 then connected to the top of the pump. The same procedure is used to run the entire riser string.

Figure 7:
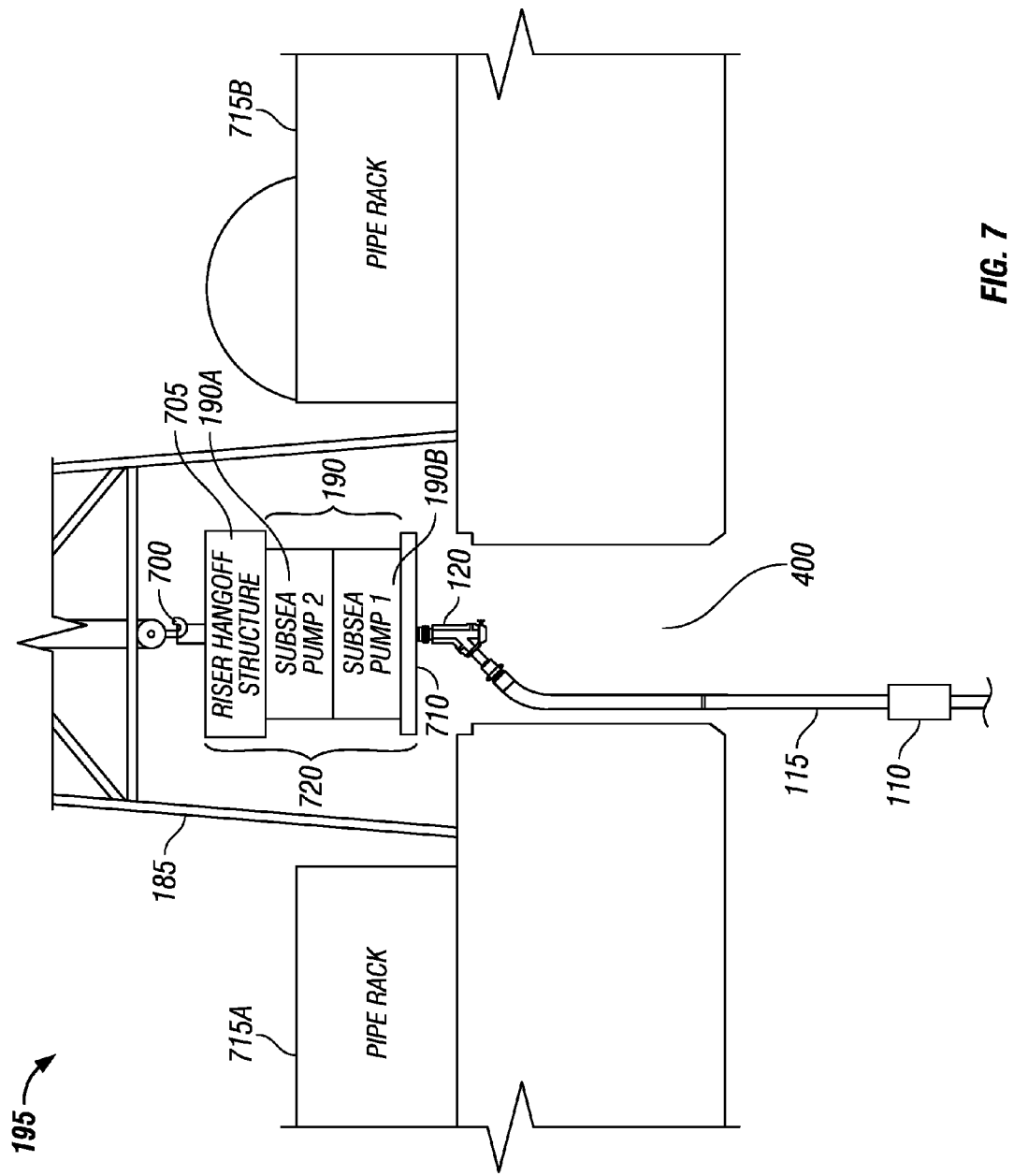
FIG. 7 illustrates a particular embodiment of the deployment of the deep sea mining riser and lift system utilizing certain aspects of the present inventions.
Figure 8:
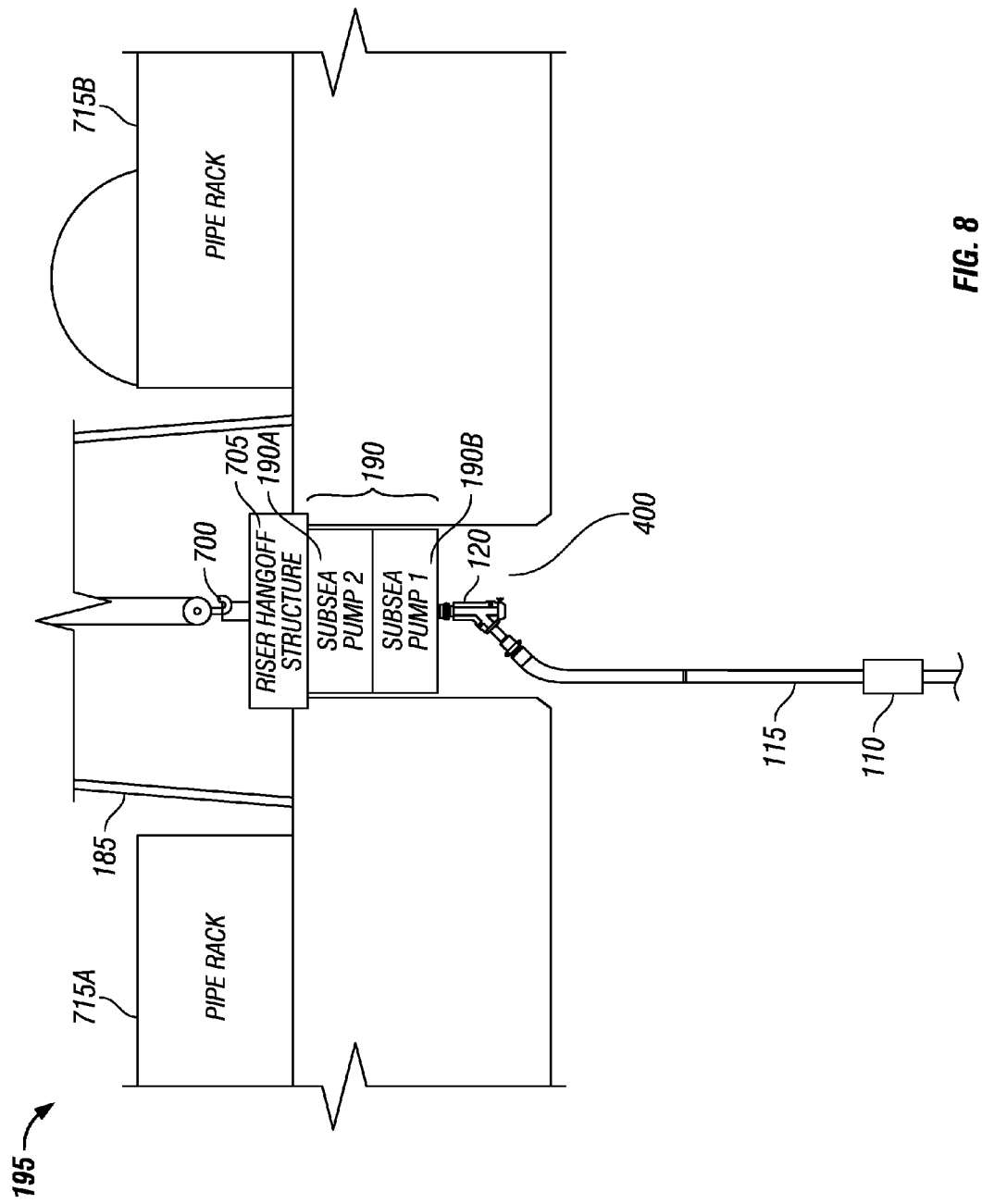
FIG. 8 illustrates a particular embodiment of the deployment of the deep sea mining riser and lift system utilizing certain aspects of the present inventions.
Figure 9:
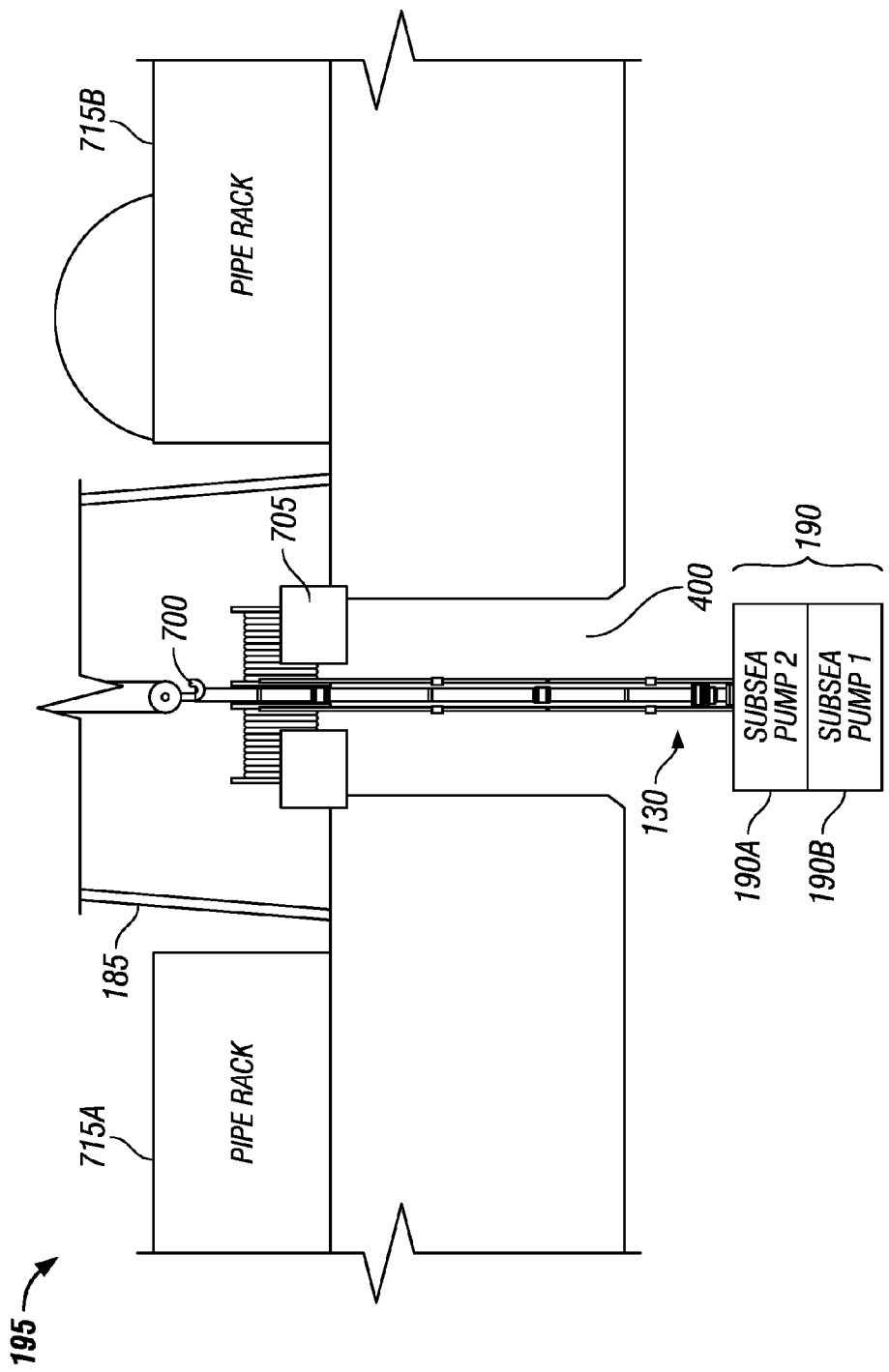
FIG. 9 illustrates a particular embodiment of the deployment of the deep sea mining riser and lift system utilizing certain aspects of the present inventions.

FIGS. 7-9 are illustrations of particular embodiments of the deployment of the deep sea mining riser and lift system utilizing certain aspects of the present inventions. FIG. 7 illustrates the riser hangoff structure 705, which may be a weldment, which fits in the ledge at the top of the moon pool and supports the riser during installation and mining operations. The riser hangoff structure (RHS) with a gimbaled riser spider may be stacked on top of the subsea pump(s) 190. The combined assembly 720 may then be picked up by the rig hook 700 as a combined assembly. FIG. 8 illustrates the combined how assembly 720 may be lowered and hung off on the moon pool 140. A "ledge" at the top of the moon pool may be included to accommodate and support the riser hangoff structure 720. As is illustrated in FIG. 9, when the hook picks up the weight of subsea pump(s) 190 with the first riser joint of the riser 130, the riser hangoff structure 700 is disconnected from the subsea pump(s) 190 and the rest of the riser 130 picked up and installed.

Further, a derrick 185 may be centered over the moon pool. Riser pipe may be delivered to the derrick for installation from the catwalks. The catwalks on either side of the derrick may each have a riser catwalk candling tool, which may accept pipe delivered by the boom cranes and deliver it to the center of the derrick. There may be a pipe rack 715A and 715B (collectively 715) fore and aft of the derrick. One pipe rack may have skids supported above it. It is preferred that these skids be out of the way (deployed subsea or shifted)

before this pipe is deployed. Subsea pumps and various skids will be delivered to the center of the derrick via a transporter skid which is opposite the draw work. Transporter skids can accept equipment from the deck crane and can either skid the equipment to the center line of the moon pool or be used to support hose reels as required for installation. The derrick can be complete with lights, communications, industrial air, and hydraulic supply as required. The hoisting equipment, which can be used to deploy the riser and pump system, includes draw-works, crown block, traveling block with dolly and bales and elevators. Utility air tuggers may also situated on the main deck under the derrick to assist riser handling operations.

The process of "stacking" the riser hangoff structure 700 on top of the subsea pump(s) 190 allows for a simple rig design without the necessity of having complicated structures using hydraulically skidded or hinged support structures. It may also be desirable to hang off or support the subsea pump(s) 190 from below while activating a hydraulically skidded or hinged support structure.

Figure 10:
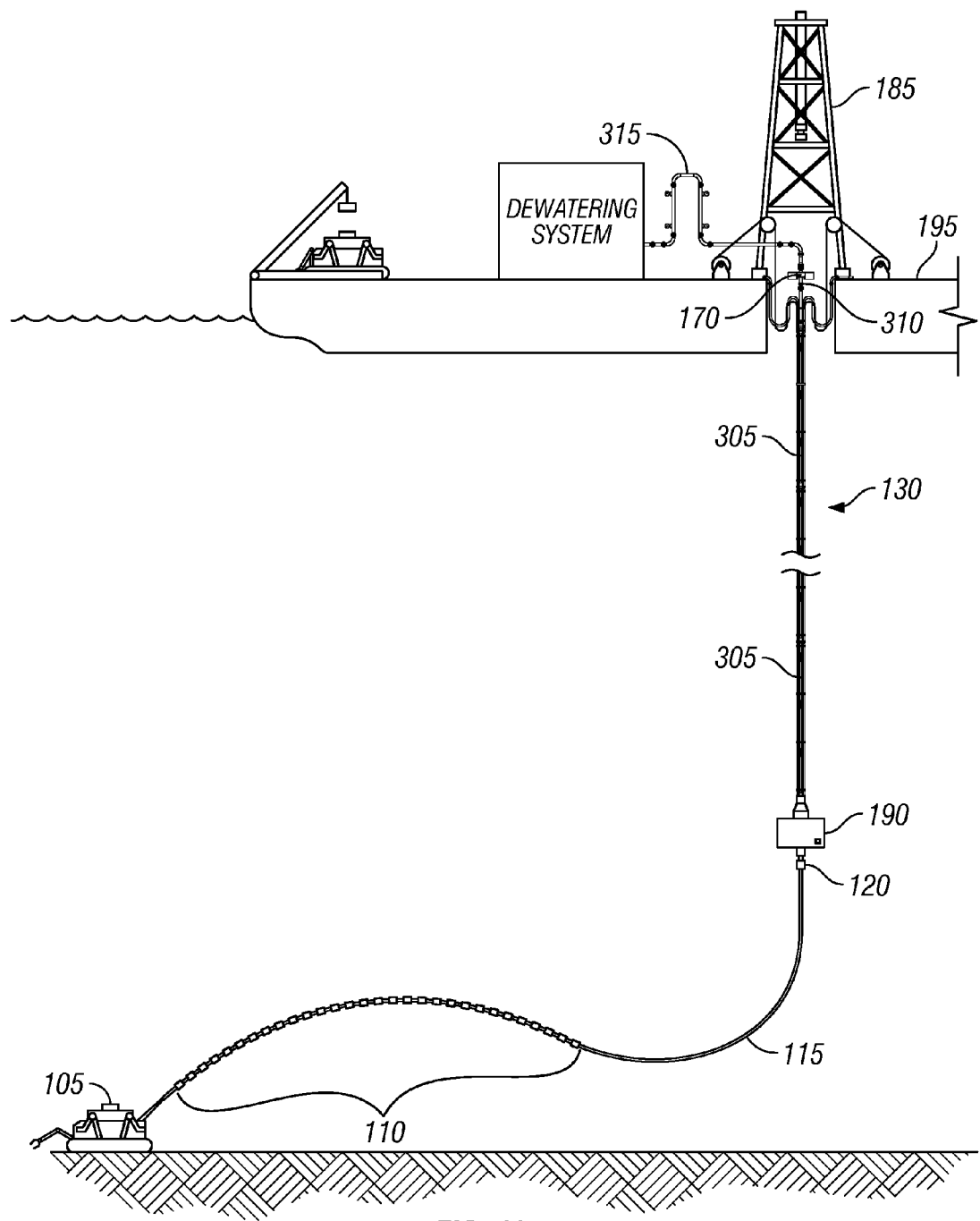
FIG. 10 illustrates a particular embodiment of a deep sea mining riser system utilizing certain aspects of the present inventions.
Figure 11:
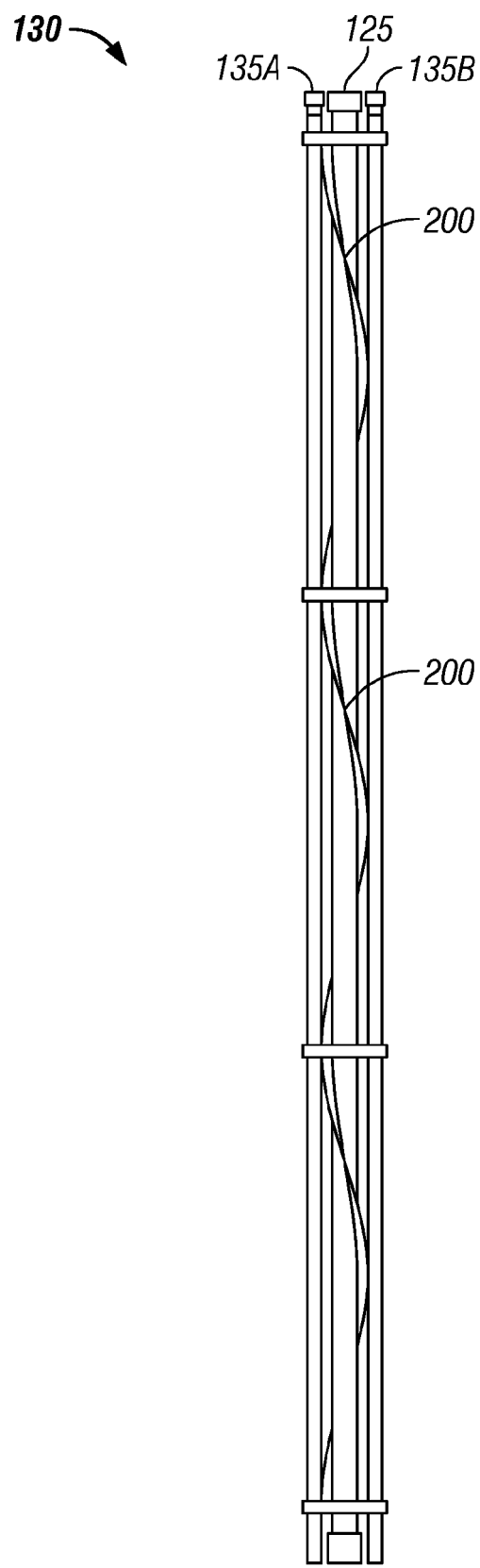
FIG. 11 illustrates the particular embodiment of a riser with straked joints.
Figure 12:
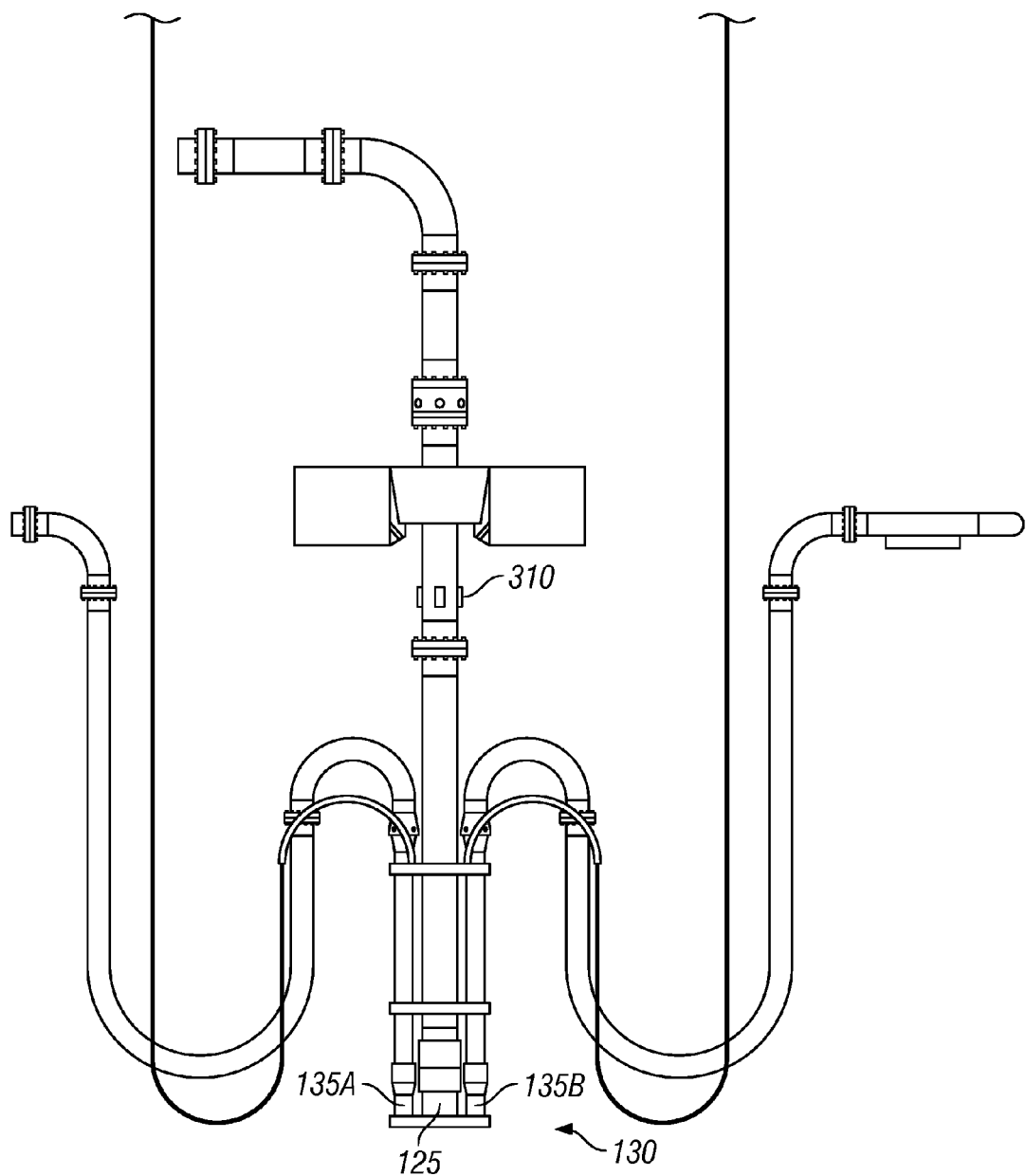
FIG. 12 illustrates a particular embodiment of a deep sea mining riser system utilizing certain aspects of the present inventions.

FIG. 10 is an illustration of a riser system with a monitoring system for mining and producing solids, including SMS, through dynamically suspended subsea pump(s) 190 at the bottom of a vertical riser 130 that extends to the surface vessel 195 using an environmentally safe surface closed loop wastewater system to power the subsea pump 190. The riser system includes a riser 130, preferably composed of steel, with water injection lines 135. The displacement pump is suspended at the bottom end of the riser 130. The location of the subsea pump(s) 190 may be placed at the bottom of the riser 130 for the efficient pumping of the slurry and as a means of providing tension to the riser 130 to minimize fatigue. As it is suspended above the sea floor, the subsea pump(s) 190 can provide a high degree of mobility so that the riser system can be positioned any where on the mine site. To enhance the fatigue performance of the riser system and to allow for positioning of the riser system over the desired location within the mine site, the riser can be fitted with straked joints 205 as shown in FIG. 11. The straked joints 205 may be fitted only at the upper one third to one half of the water column. Preferably the straked joints 205 form a helical pattern as shown in FIG. 11.

As is described above, the jumper 115 can be designed to be lowered vertically to the sea level with the help of a clump weight then winched in and connected to the subsea miner 105. The jumper 115 can forms an "S" shape through the design and placement of the buoys 110 clamped along the flexible jumper as shown in FIG. 10. The "S" shape jumper 115 can decouple the motion of the riser from the subsea miner 105 thus protecting the jumper 115 from over stretching and protecting the subsea miner 105 from over turning.

The mined ore, including, but not limited to, seafloor massive sulfide (SMS), can be transported in the slurry form starting from ore cutting, filtering and suction at the cutter head of the subsea miner 105. The ore can then be mixed with the sea water into a slurry form and pumped through the piping of the subsea miner 105 and into the jumper 115. The subsea pumps(s) 190 can open to allow the slurry to be pressurized and forced into the riser 130 which can continue flowing through the riser 130 and into the a dewatering system in the surface vessel 195. The ore can then dewatered and offloaded into a shuttle vessel for transporting onshore. The waste water can be made up with the fresh sea water and pressurized by the surface high pressure pumps then delivered through the two water injection lines 135 to the compression chambers of the subsea pump(s) 190. Upon completing the compression cycles of the subsea pump(s) 190, the waste water can be discharged at the sea floor level.

In an alternative embodiment as described below, the embodiment can further help ensure a consistent and stable flow of slurry. To sustain a desired flow of mined slurry, production feedback for adjusting the cutting may be required. Production feedback can include, but is not limited to, monitoring tension, pressure and flow rate and providing a method for computing the key production indicators utilizing these monitored data. The method helps to ensure a consistent and stable flow of slurry, a consistent and stable in-situ production rate and provides dewatering system efficiency monitoring.

Transporting slurry from the seafloor through a riser 130 can encounter an instable flow situation where the solids accumulation occurs at the vicinity of the inlet sometimes to the point that gross dropping of the solids suddenly occurs. When this happens, the transported solids inside the riser 130 can collapse to the bottom end of the riser 130. Although equipped with a dump valve assembly 120 to handle the dumping of the solids from the bottom of the riser 130, the post event of cleaning and start up cycles may not desirable due to the time and expense. Using continuous cutting machine in the subsea miner 105, the solids intake still can be interrupted when raising the cutting arm or the machine is adjusting from one location to another. The goal of a stable flow is to maximize the cutting but also maintaining a slurry mixture speed which minimizes the possibility of a slurry backup. Ideally, this can be accomplished by maintaining a slurry mixture speed that is at least four times of the largest particle settling speed. Considering the non-uniform solids intake using a cutting machine, less cutting or more water may need to be pumped into the riser system prior to the onset of a instable flow.

This disclosures further allows for the measurement of the in-situ production, instant feedback of the onset of a instable flow and can recommend continuing pumping of sea water into the riser system or simply stop the cutting intake to prevent an instable flow from happening. These goals can be accomplished in a number of ways. Below is a description of a sequence or process for utilizing the in-situ production rate measurement to maximize ore production, including but not limited to, seafloor massive sulphide production.

The sequence or process can utilize several measurement to maximize the efficiency of the ore production including ensuring a consistent and stable flow of slurry.

As indicated in FIGS. 10 to 13, measurements can include, for example, the following components: (i) accelerometers 305 along the riser 130 (shown in FIG. 10); (ii) remote wireless or wired tension measurement devices 310 on the riser 130, preferably towards the top (shown in FIG. 12); (iii); pressure measurements including, for example, P1-P4, through a U-loop tube 315 (shown in FIG. 13); and (iv) volumetric flow rate measurement as part of the subsea miner 105 or the subsea pump(s) 190. Other and further embodiments utilizing one or more measurements of the inventions described above can be used without departing from the spirit of Applicants' invention. Further, the various measurements of or around the deep sea mining riser and lift system can be included in combination with each other to produce variations of the disclosed methods and embodiments.

The riser 130 allows measurement of in-situ wet weight of the riser system. The sequence allows the filtering of the dynamic effect on the wet weight measurement. The wet weight of the riser system is further used for computing the in-situ production contents. The in-situ wet weight measurement and the base line reading allows the computation of the in-situ solids contained in the riser 130. The measured in-situ volumetric concentration combined with the in-situ contents allows the computation of the averaged solid density. The in-situ production rate of solids is computed using the measured and computed solid density, volumetric solid concentration, and flow rate.

This in-situ computed production rate can be recorded for the daily production report. The riser system behavior can be monitored by checking frequency components of the measured riser top tension and the accelerometers placed along the riser as shown in FIG. 10.

Flow instability can be found from the measured data. For example, in-situ low volumetric concentration combined with a high wet weight of the riser system may indicate onset of an instable flow. The measured information can be used for making decision on opening the dump valve or simply raise the cutter head and allows the water to be continuously pumped into the riser system until the in-situ concentration is in line with the riser content measurement. The in-situ solid volumetric concentration with the in-situ contents weight can also be used to adjust the cutting rate for improving the overall production rate without triggering an instable flow condition. The efficiency of dewatering system can be derived using the computed production rate and the actual production rate.

The following sequence or set of steps is an example of the filtering of the dynamic response for computing the in-situ wet weight of the mined ore inside the riser 130. A person of skill would understand this is one only embodiment of the sequence. Using the above measurements or other measurements in the system, one can receive instant feedback on the flow of mined ore in the riser, determine the onset of instable flow and then determine a solution to stop or prevent the unstable flow, including, but not limited to, continuing pumping of sea water into the riser system or simply stop the cutting intake to prevent an instable flow from happening. The following sequence or set of steps can be performed on a computer readable media comprising instructions for execution by a processor, on a computer system comprising instructions for execution by a processor or other method known to a person of ordinary skill.

One of the steps includes calculating the in-situ wet weight of the riser system. top tensions measured at the top of riser 130 are mainly used to measure top tension of the riser system. The riser 130 allows measurement of in-situ wet weight of the riser system. The effective top tension of the riser 130 (T(t)) includes the total static wet weight ($W_s$) of the riser 130 including the content, and an inertia force due to acceleration of the surface vessel 195 in the vertical direction. The top tension of the riser 130 can thus be formulated in Equation (1) as:

$$T(t) = W_s + m(t)\alpha_v, \qquad (1)$$

In which, m(t) is the total mass of the riser system including slurry content, $\alpha_v$ is vessel vertical acceleration and is caused by environmental conditions imposed on the mining vessel. The initial static wet weight of the riser system where the riser 130 is filled with sea water can be established by taking an initial reading of the top tension measurement through the approximation of the tension time traces as shown in Equation (2).

$$W_s = \int_0^{t_0} T(t)\,dt, \qquad (2)$$

Figure 14:
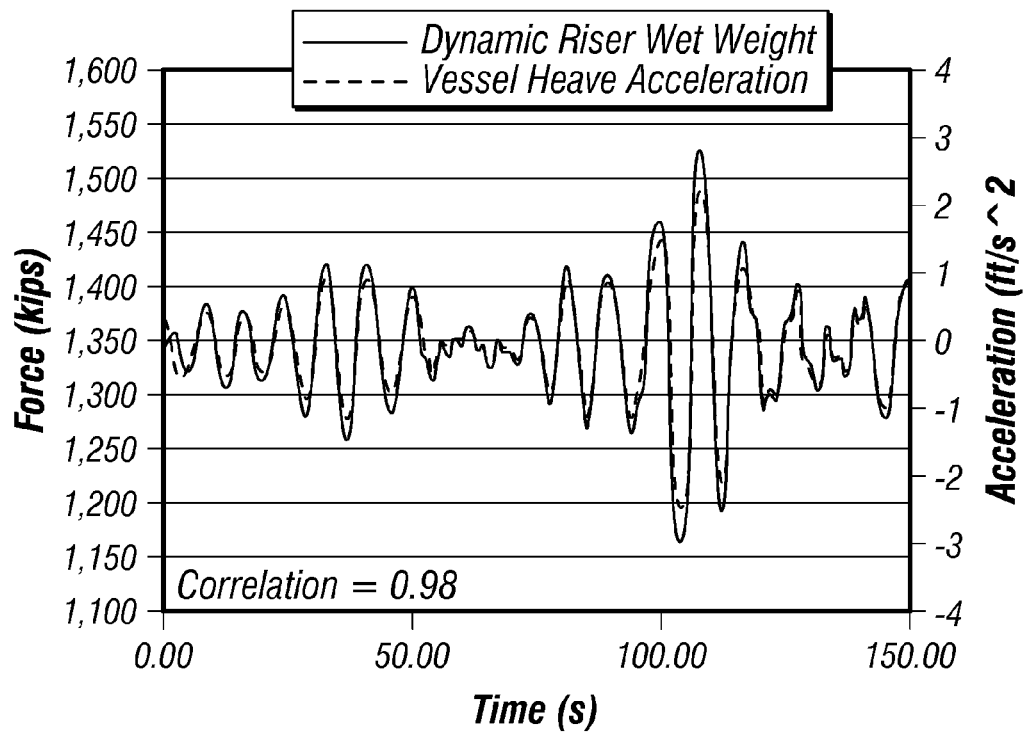
FIG. 14 illustrates the amount of correlation between a top tension of a riser can with the acceleration of a surface vessel in a vertical direction.

Further, typically, the mean value of acceleration of the surface vessel 195 in vertical direction can be insignificant. It is found that the top tension of a riser 130 can be highly correlated with the acceleration of the surface vessel 195 in a vertical direction, as illustrated in FIG. 14.

Additionally, the frequency content of top tension of the riser 130 can be found by calculating its power spectrum density, $P_T(\omega)$, which is formulated in Equation (3) as:

$$P_T(\omega) = \frac{1}{2\pi}\int_{-\infty}^{+\infty} R_T(\tau) e^{-i\omega\tau}\,d\tau, \qquad (3)$$

Where $R_T(\tau)$ is the autocorrelation function of T(t), which is defined as the average value of the product T(t)T(t+$\tau$). Once found, the motion of the surface vessel induced axial vibrations, for example, can be filtered from the tension data.

Another step is to calculate the wet weight of the riser 130 with sea water and/or slurry content. The wet weight of the riser 130 with content of sea water, $W_0$, can be measured by filling up the riser system in a start up procedure. The riser system mass with slurry content, m(t), can be estimated using the slurry mixture density which is derived later. Therefore, the estimation of riser 130 wet weight $W_s$ can be further improved by considering mean effect of vessel acceleration with Equation (1).

The riser 130 static wet weight, $W_s$, varies with slurry content, the property of which is time dependent. The increment of riser wet weight with respect to that with the content of water is formulated in Equation (4) as:

$$\Delta W(t) = W_s(t) - W_0 = (\rho_m - \rho_f) g \sum_i V_i, \qquad (4)$$

In which, $\rho_m$ is slurry mixture density; $\rho_f$ is density of sea water; g is the acceleration of gravity; and $V_i$ is internal volume for the jumper 115, subsea pump(s) 190, and riser 130. To calculate the increment of riser wet weight a person of skill can first calculate the internal volume $V_i$ for the jumper 115, subsea pump(s) 190, and riser 130. The internal volume $V_i$ for the jumper 115, subsea pump(s) 190, and riser 130 can be calculated using:

$$V_i = \frac{\pi}{4} d_i^2 l_i,$$

where $d_i$ is pipe internal diameter and $l_i$ is pipe length. The in-situ slurry mixture density, $\rho_m(t)$, is thus calculated in Equation (5) as:

$$\rho_m(t) = \rho_f + \frac{\Delta W(t)}{g \sum_i V_i}, \qquad (5)$$

The specific gravity of slurry, $S_m(t)$, is the ratio of slurry mixture density, $\rho_m(t)$, to that of fresh water $\rho_w$, and is show in Equation (6) as:

$$S_m(t) = \frac{\rho_f}{\rho_w} + \frac{\Delta W(t)}{\rho_w g \sum_i V_i}, \quad (6)$$

The specific gravity of solids is represented by $S_s$. The in-situ specific gravity of the mixture can be generally formulated as Equation (7).

$$S_m(t) = S_s C_{vi} + S_f(1 - C_{vi}), \quad (7)$$

In which, $S_f$ is defined as $\rho_f/\rho_w$; $C_{vi}$ is volumetric concentration of solids, i.e. the fraction of mixture volume which is occupied by the solids.

Figure 13:
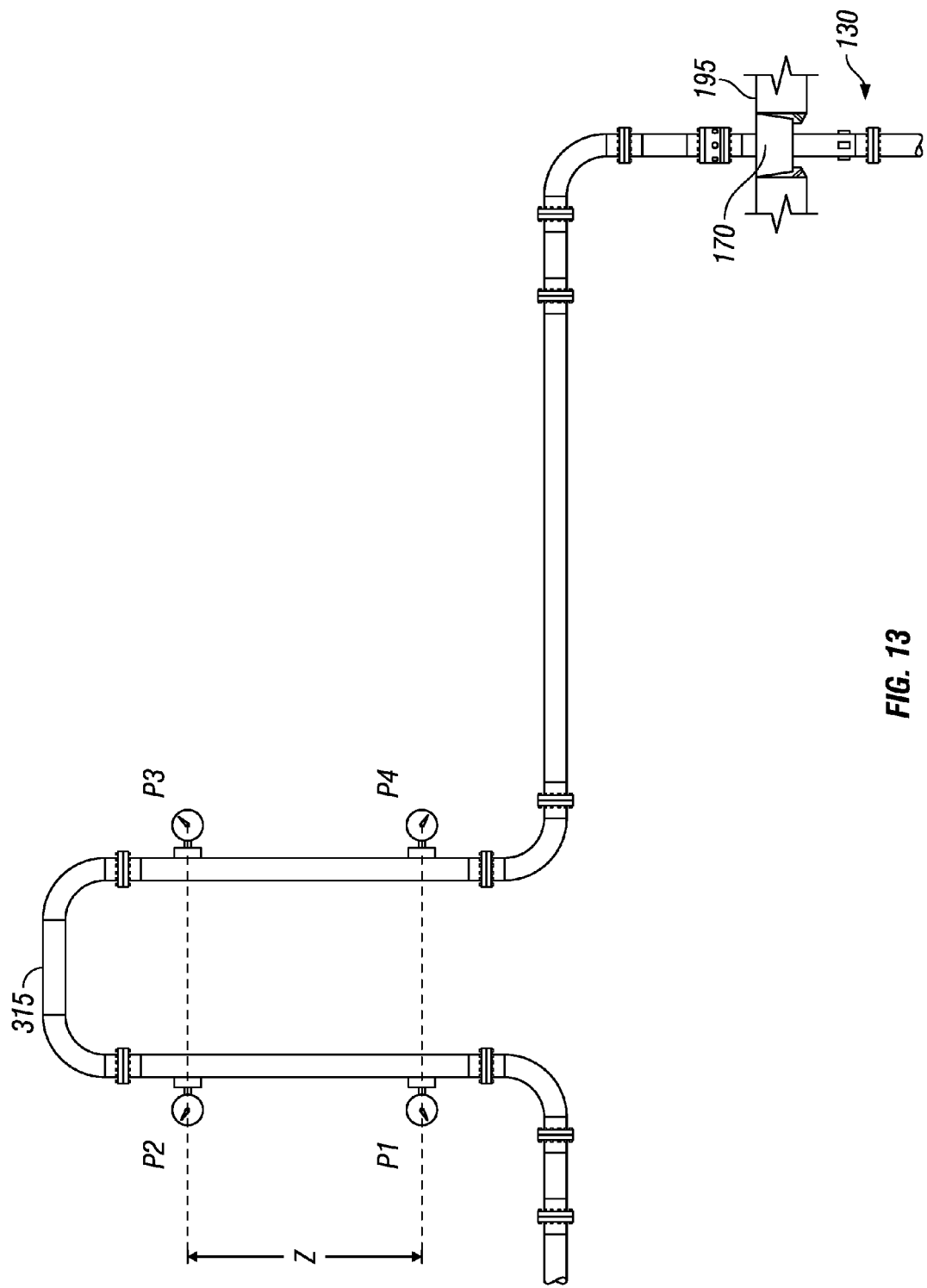
FIG. 13 illustrates a particular embodiment of a deep sea mining riser system utilizing certain aspects of the present inventions.

The U-loop tube profile, as shown in FIG. 13 can be implemented at the down stream of the riser 130. Using the pressure measurements, of pressure sensors P1-P4, taken from the vertical U-loop tube 315, the following expression for $C_{vi}$, the mean in-situ volumetric concentration of solids can be measured, and is shown in Equation (8) as:

$$C_{vi} = \frac{1}{(S_s - 1)} \left[ \frac{(p_1 - p_2) + (p_4 - p_3)}{2\rho_f g z} - 1 \right], \quad (8)$$

In which, $p_i$ (i=1 to 4) is measured pressure and z is distance (shown in FIG. 13). It should be appreciated by a person of skill that the pressure sensors can include any variety or type or number of pressure sensors. Other configurations of the pressure sensors can be used. The U-loop profile may be further embodied by any combination of one rising and one descending vertical pipe or one descending and one rising pipe. FIG. 13 is just one example. For example, the U-loop may be inverted. Preferably, the horizontal distance between the two vertical pipes of the U-loop tube profile is not too long, for example, the horizontal distance can be maintained at less than 20 D where D is the pipe diameter. The rising and descending pipe, for example, the U-loop tube, can minimize or eliminate the need to carry the slurry flow shear stresses at the pipe wall in computation and can keep the measured pressure differences for computing volumetric solids concentration. It should be appreciated that the mean in-situ volumetric concentration of solids can be calculated without the use of the U-loop tube profile.

The in-situ slurry mixture specific gravity, $S_m(t)$, is estimated by using Equation (6) with the measured data. The in-situ volumetric concentration, $C_{vi}$, and specific gravity of solid particles, $S_s$, can be derived from Equation (7) and (8).

$$C_{vi} = 1 + \frac{S_m}{1 - S_f} - \frac{(p_1 - p_2) + (p_4 - p_3)}{2(1 - S_f)\rho_f g z}, \quad (9)$$

Once $C_{vi}(t)$ is known from Equation (9), the specific gravity of solids, $S_s(t)$ can be solved from Equation (10) that is;

$$S_s = 1 + \left[ \frac{(p_1 - p_2) + (p_4 - p_3)}{2\rho_f g z} - 1 \right] / C_{vi}, \quad (10)$$

With the measured slurry volumetric flow rate, $Q_m(t)$, in-situ volumetric concentration of solids, $C_{vi}(t)$ derived from Equation (9), and specific gravity of solid particles, $S_s(t)$, the in-situ ore production rate, $P_r(t)$ can be estimated using Equation (11).

$$P_r(t) = Q_m(t) C_{vi}(t) S_s(t) \quad (11)$$

Figure 15:
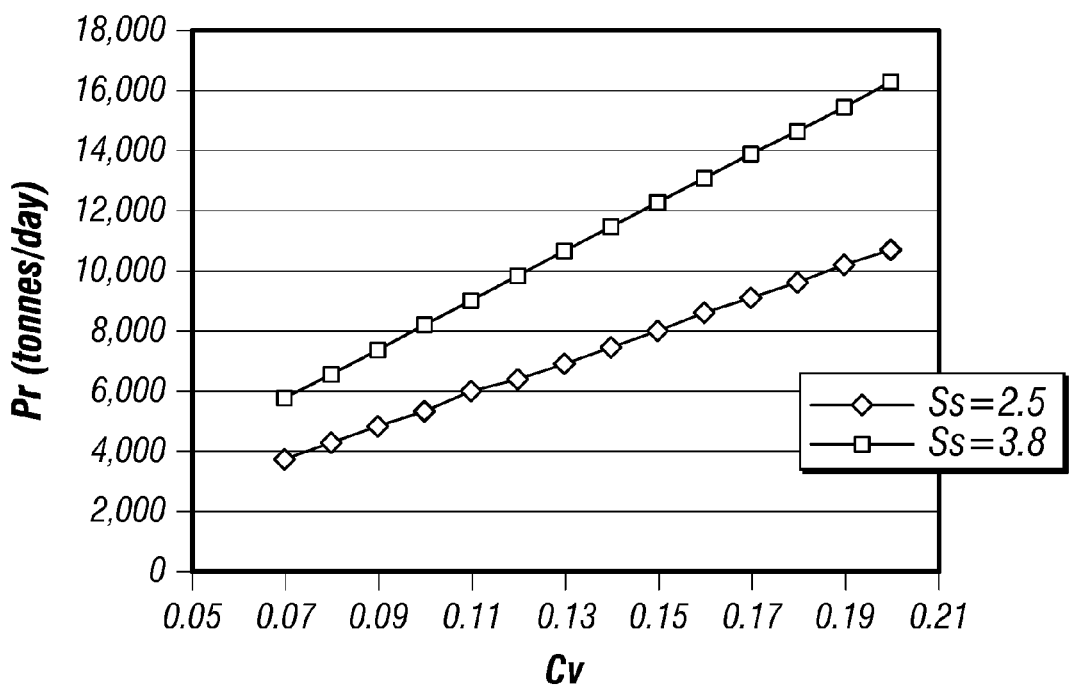
FIG. 15 illustrates the production rate variation with slurry volumetric concentration and solid specific gravity for a particular flow rate.

As an example, FIG. 15 illustrates the production rate variation with slurry volumetric concentration and solid specific gravity for a steady flow rate of 980 m³/hour (4,300 pgm). It indicates that the production rate does vary with flow rate, volumetric flow rate, and solid specific gravity.

An exemplary system that may be used to ensure a consistent and stable flow of slurry in a riser system as described above, according to the disclosed embodiments, may include at least one server. Any suitable server known to those having ordinary skill in the art may be used as part of the system, including a workstation, a Web server, a main frame, and the like. Such a server typically includes a bus or other communication mechanism for communicating information and a processor coupled with the bus for processing information. The server may also include a main memory, such as a random access memory (RAM) or other dynamic storage device, coupled to the bus for storing computer readable instructions to be executed by the processor. The main memory may also be used for storing temporary variables or other intermediate information during execution of the instructions to be executed by the processor. The server may further include a read only memory (ROM) or other static storage device coupled to the bus for storing static information and instructions for the processor. A computer readable storage device, such as a magnetic disk or optical disk, may be coupled to the bus for storing information and instructions for the processor.

The server may be coupled via the bus to a display, such as a cathode ray tube (CRT) or a flat screen monitor, for displaying information to a user. An input device, including, for example, alphanumeric and other keys, may be coupled to the bus for communicating information and command selections to the processor. Another type of user input device may be a cursor control, such as a mouse, a trackball, or cursor direction keys for communicating direction information and command selections to the processor, and for controlling cursor movement on the display. The cursor control typically has two degrees of freedom in two axes, a first axis (e.g., X axis) and a second axis (e.g., Y axis), that allow the device to specify positions in a plane.

The term "computer readable instructions" as used above refers to any instructions that may be performed by the processor and/or other components. Similarly, the term "computer readable medium" refers to any storage medium that may be used to store the computer readable instructions. Such a medium may take many forms, including, but not limited to, non volatile media, volatile media, and transmission media. Non volatile media may include, for example, optical or magnetic disks, such as the storage device. Volatile media may include dynamic memory, such as main memory. Transmission media may include coaxial cables, copper wire and fiber optics, including wires of the bus. Transmission may take the form of acoustic or light waves, such as those generated during radio frequency (RF) and infrared (IR) data communications. Common forms of computer readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

Various forms of the computer readable media may be involved in carrying one or more sequences of one or more instructions to the processor for execution. For example, the instructions may initially be borne on a magnetic disk of a remote computer. The remote computer can load the instructions into its dynamic memory and send the instructions over a telephone line using a modem. A modem local to the system can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on the storage device either before or after execution by the processor.

The server may also include a communication interface coupled to the bus. The communication interface typically provides a two way data communication coupling between the server and the network. For example, the communication interface may be an integrated services digital network (ISDN) card or a modem used to provide a data communication connection to a corresponding type of telephone line. As another example, the communication interface may be a local area network (LAN) card used to provide a data communication connection to a compatible LAN. Wireless links may also be implemented. Regardless of the specific implementation, the main function of the communication interface is to send and receive electrical, electromagnetic, optical, or other signals that carry digital data streams representing various types of information.

Other and further embodiments utilizing one or more aspects of the inventions described above can be devised without departing from the spirit of Applicants' invention. Further, the various methods and embodiments of the deep sea mining riser and lift system can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of monitoring and adjusting a flow rate of a slurry in a riser system of a deep sea mining system, the slurry having a quantity of water and the riser system having a riser, comprising:
    measuring an in-situ volumetric concentration of the slurry in the riser system, comprising:
       providing a U-loop tube downstream of the riser;
       providing at least two pressure sensors coupled to the U-loop tube on each side of the U-loop tube; and
       using a pressure reading of the at least four pressure sensors to calculate the in-situ volumetric concentration of the slurry in the riser;
    measuring a weight of the riser; and
    adjusting the amount of water in the slurry to change the flow rate of the slurry.

2. The method of claim 1, wherein the U-loop tube comprises one rising pipe and one descending pipe.

3. The method of claim 1, wherein measuring the weight of the rise system comprises measuring an increase in the wet weight of the rise system.

4. The method of claim 1, further comprising maintaining a slurry mixture speed that is at least four times of the largest particle settling speed.

5. The method of claim 1, wherein adjusting the amount of water in the slurry to change the flow rate of the slurry comprises opening a valve assembly to allow more water into the riser.

6. The method of claim 1, wherein adjusting the amount of water in the slurry to change the flow rate of the slurry comprising lifting a cutter head without cutting to allow more water into the riser.

7. The method of claim 1, wherein opening a valve assembly or a cutter head to allow more water into the riser system in response to the volumetric concentration in the riser and weight of the riser.

8. The method of claim 1, wherein measuring a weight of the riser system is calculated by using measurements of a suspended riser of the riser system.

9. The method of claim 1, wherein the slurry includes a seafloor massive sulfide deposits.

10. A method of monitoring and adjusting a flow rate of a slurry in a riser system of a deep sea mining system, the slurry having a quantity of water and the riser system having a riser, comprising:
    mining solids from the sea floor;
    combining the solids with water to form a slurry;
    transporting the slurry through a riser system;
    measuring an in-situ volumetric concentration of the slurry in the riser system,
    measuring a weight of the riser; and
    adjusting the amount of water in the slurry to change the flow rate of the slurry.

11. The method of claim 10, wherein the measuring an in-situ volumetric concentration of the slurry in the riser system further comprises:
    providing a U-loop tube downstream of the riser;
    providing at least two pressure sensors coupled to the U-loop tube on each side of the U-loop tube; and
    using a pressure reading of the at least four pressure sensors to calculate the in-situ volumetric concentration of the slurry in the riser.

12. The method of claim 10,
    wherein measuring an in-situ volumetric concentration of the slurry in the riser comprises measuring a decrease in volumetric concentration, and
    wherein measuring the weight of the rise system comprises measuring an increase in the wet weight of the rise system.

13. The method of claim 10, further comprising maintaining a slurry mixture speed that is at least four times of the largest particle settling speed.

14. The method of claim 10, wherein adjusting the amount of water in the slurry to change the flow rate of the slurry comprises opening a valve assembly to allow more water into the riser.

15. The method of claim 10, wherein adjusting the amount of water in the slurry to change the flow rate of the slurry comprising lifting a cutter head without cutting to allow more water into the riser.

16. The method of claim 10, wherein opening a valve assembly or lifting a cutter head to allow more water into the riser system in response to the volumetric concentration in the riser and weight of the riser

17. The method of claim 10, wherein measuring a weight of the riser system is calculated by using measurements of a suspended riser of the riser system.

18. The method of claim 10, wherein the slurry includes a seafloor massive sulfide deposits.

* * * * *